(12) United States Patent
Tour et al.

(10) Patent No.: US 10,236,135 B2
(45) Date of Patent: Mar. 19, 2019

(54) NI(OH)2 NANOPOROUS FILMS AS ELECTRODES

(71) Applicants: James M. Tour, Bellaire, TX (US); Yang Yang, Beijing (CN)

(72) Inventors: James M. Tour, Bellaire, TX (US); Yang Yang, Beijing (CN)

(73) Assignee: WILLIAM MARSH RICE UNIVERSITY, Houston, TX (US)

(*) Notice: Subject to any disclaimer, the term of this patent is extended or adjusted under 35 U.S.C. 154(b) by 57 days.

(21) Appl. No.: 15/193,529

(22) Filed: Jun. 27, 2016

(65) Prior Publication Data

US 2016/0379764 A1    Dec. 29, 2016

Related U.S. Application Data

(60) Provisional application No. 62/184,783, filed on Jun. 25, 2015.

(51) Int. Cl.
H01B 1/02 (2006.01)
H01G 11/30 (2013.01)
(Continued)

(52) U.S. Cl.
CPC .............. H01G 11/30 (2013.01); C25D 9/06 (2013.01); H01B 1/02 (2013.01); H01G 11/26 (2013.01);
(Continued)

(58) Field of Classification Search
CPC .......... C25D 9/06; H01G 11/26; H01G 11/30; H01G 11/68; H01G 11/86;
(Continued)

(56) References Cited

U.S. PATENT DOCUMENTS 3,507,697 A * 4/1970 Korman ............... H01M 4/28
                                                       205/60
4,224,392 A * 9/1980 Oswin ................. H01M 4/64
                                                       429/206
(Continued)

OTHER PUBLICATIONS

Yang et al., "Electrodeposited nickel hydroxide on nickel foam with ultrahigh capacitance," Chem. Commun., pp. 6537-6539 (2008) (Year: 2008).*

(Continued)

*Primary Examiner* — Mark Kopec
*Assistant Examiner* — Jaison P Thomas
(74) *Attorney, Agent, or Firm* — Winstead PC

(57) ABSTRACT

The present disclosure pertains to electrodes that include a nickel-based material and at least one porous region with a plurality of nickel hydroxide moieties on a surface of the nickel-based material. The nickel-based material may be a nickel foil in the form of a film. The porous region of the electrode may be directly associated with the surface of the nickel-based material. The nickel hydroxide moieties may be in crystalline form and embedded with the porous region. The electrodes of the present disclosure may be a component of an energy storage device, such as a capacitor. Additional embodiments of the present disclosure pertain to methods of fabricating the electrodes by anodizing a nickel-based material to form at least one porous region on a surface of the nickel-based material; and hydrothermally treating the porous region to form nickel hydroxide moieties associated with the porous region.

34 Claims, 12 Drawing Sheets

(51) Int. Cl.
| | | |
|---|---|---|
| H01M 4/66 | (2006.01) | |
| H01M 4/52 | (2010.01) | |
| H01M 4/90 | (2006.01) | |
| H01M 4/88 | (2006.01) | |
| H01M 4/04 | (2006.01) | |
| C25D 9/06 | (2006.01) | |
| H01G 11/68 | (2013.01) | |
| H01G 11/26 | (2013.01) | |
| H01G 11/86 | (2013.01) | |
| H01M 8/0206 | (2016.01) | |
| H01M 8/0232 | (2016.01) | |
| H01M 4/02 | (2006.01) | |

(52) U.S. Cl.
CPC ............. *H01G 11/68* (2013.01); *H01G 11/86* (2013.01); *H01M 4/0442* (2013.01); *H01M 4/0471* (2013.01); *H01M 4/52* (2013.01); *H01M 4/661* (2013.01); *H01M 4/8817* (2013.01); *H01M 4/8853* (2013.01); *H01M 4/9016* (2013.01); *H01M 8/0206* (2013.01); *H01M 8/0232* (2013.01); *H01M 2004/021* (2013.01)

(58) Field of Classification Search
CPC ......... H01M 2004/021; H01M 4/0442; H01M 4/0471; H01M 4/52; H01M 4/661; H01M 4/8817; H01M 4/8853; H01M 4/9016; H01M 8/0206; H01M 8/0232; H01B 1/02
See application file for complete search history.

(56) References Cited

U.S. PATENT DOCUMENTS

| | | | | |
|---|---|---|---|---|
| 4,384,928 | A * | 5/1983 | Hall | C25D 9/08 204/290.03 |
| 2004/0226825 | A1* | 11/2004 | Shiota | C25D 1/04 205/60 |
| 2010/0053845 | A1* | 3/2010 | Hua | H01G 9/02 361/502 |
| 2010/0068623 | A1* | 3/2010 | Braun | C25F 3/02 429/219 |
| 2011/0045350 | A1* | 2/2011 | Amos | C01G 45/02 429/219 |
| 2013/0115453 | A1* | 5/2013 | Fan | H05K 1/0213 428/372 |
| 2013/0122352 | A1* | 5/2013 | Harada | H01M 4/32 429/163 |
| 2014/0199591 | A1* | 7/2014 | Geng | H01M 4/366 429/213 |
| 2017/0179518 | A1 | 6/2017 | Tour et al. | |

OTHER PUBLICATIONS

Lu, Q.; Lattanzi, M. W.; Chen, Y.; Kou, X.; Li, W.; Fan, X.; Unruh, K. M.; Chen, J. G.; Xiao, J. Q. Supercapacitor Electrodes with High-Energy and Power Densities Prepared from Monolithic NiO/Ni Nanocomposites. Angew. Chem. 2011, 123, 6979-6982.
Kim, S. I.; Lee, J. S.; Ahn, H. J.; Song, H. K.; Jang, J. H. Facile Route to an Efficient NiO Supercapacitor with a Three-Dimensional Nanonetwork Morphology. ACS Appl. Mater. Interfaces 2013, 5, 1596-1603.
Lang, J. W.; Kong, L. B.; Wu, W. J.; Luo, Y. C.; Kang, L. Facile Approach to Prepare Loose-Packed NiO Nano-flakes Materials for Supercapacitors. Chem. Commun. 2008, 35, 4213-4215.
Kim, J. H.; Zhu, K.; Yan, Y.; Perkins, C. L.; Frank, A. J. Microstructure and Pseudocapacitive Properties of Electrodes Constructed of Oriented NiO—TiO2 Nanotube Arrays. Nano Lett. 2010, 10, 4099-4104.
Wang, B.; Chen, J. S.; Wang, Z.; Madhavi, S.; Lou, X. W. Green Synthesis of NiO Nanobelts with Exceptional Pseudo-Capacitive Properties. Adv. Energy Mater. 2012, 10, 1188-1192.
Wang, H.; Casalongue, H. S.; Liang, Y.; Dai, H. Ni(OH)2 Nanoplates Grown on Graphene as Advanced Electrochemical Pseudocapacitor Materials. J. Am. Chem. Soc. 2010, 132, 7472-7477.
Yan, J.; Fan, Z.; Sun, W.; Ning, G.; Wei, T.; Zhang, Q.; Zhang, R.; Zhi, L.; Wei, F. Advanced Asymmetric Supercapacitors Based on Ni(OH)2/Graphene and Porous Graphene Electrodes with High Energy Density. Adv. Funct. Mater. 2012, 22, 2632-2641.
Ji, J.; Zhang, L. L.; Ji, H.; Li, Y.; Zhao, X.; Bai, X.; Fan, X.; Zhang, F.; Ruoff, R. S. Nanoporous Ni(OH)2 Thin Film on 3D Ultrathin-Graphite Foam for Asymmetric Supercapacitor. ACS Nano 2013, 7, 6237-6243.
Dubal, D. P.; Gund, G. S.; Lokhande, C. D.; Holze, R. Decoration of Spongelike Ni(OH)2 Nanoparticles onto MWCNTs Using an Easily Manipulated Chemical Protocol for Supercapacitors. ACS Appl. Mater. Interfaces 2013, 5, 2446-2454.
Gund, G. S.; Dubal, D. P.; Jambure, S. B.; Shinde, S. S.; Lokhande, C. D. Temperature Influence on Morphological Progress of Ni(OH)2 Thin Films and Its Subsequent Effect on Electrochemical Supercapacitive Properties. J. Mater. Chem. A 2013, 1, 4793-4803.
Pech, D.; Brunet, M.; Durou, H.; Huang, P.; Mochalin, V.; Gogotsi, Y.; Taberna, P. -L.; Simon, P. Ultrahigh-Power Micrometre-Sized Supercapacitors Based on Onion-Like Carbon. Nat. Nanotechnol. 2010, 5, 651-654.
Lang, X.; Hirata, A.; Fujita, T.; Chen, M. Nanoporous Metal/Oxide Hybrid Electrodes for Electrochemical Supercapacitors. Nat. Nanotechnol. 2011, 6, 232-236.
Zhu, Y.; Murali, S.; Stoller, M. D.; Ganesh, K. J.; Cai, W.; Ferreira, P. J.; Pirkle, A.; Wallace, P. M.; Cychosz, K. A.; Thommes, M.; et al. Carbon-Based Supercapacitors Produced by Activation of Graphene. Science 2011, 332, 1537-1541.
Kötz, R.; Carlen, M. Principles and Applications of Electrochemical Capacitors. Electrochimica Acta 2000, 45, 2483-2498.
Conway, B. E. Transition from "Supercapacitor" to "Battery" Behavior in Electrochemical Energy Storage. J. Electrochem. Soc. 1991, 138, 1539-1548.
Wang, G.; Zhang, L.; Zhang, J. A Review of Electrode Materials for Electrochemical Supercapacitors. Chem. Soc. Rev. 2012, 41, 797-828.
Zhang, L. L.; Zhao, X. S. Carbon-Based Materials as Supercapacitor Electrodes. Chem. Soc. Rev. 2009, 38, 2520-2531.
Armand, M.; Endres, F.; MacFarlane, D. R.; Ohno, H.; Scrosati, B. Ionic-Liquid Materials for the Electrochemical Challenges of the Future. Nat. Mater. 2009, 8, 621-629.
Fan, Z.; Yan, J.; Wei, T.; Zhi, L.; Ning, G.; Li, T.; Wei, F. Asymmetric Supercapacitors Based.On Graphene/MnO2 and Activated Carbon Nanofiber Electrodes with High Power and Energy Density. Adv. Funct. Mater. 2011, 21, 2366-2375.
Aricò, A. S.; Bruce, P.; Scrosati, B.; Tarascon, J.-M.; Schalkwijk, W. Nanostructured Materials for Advanced Energy Conversion and Storage Devices. Nat. Mater. 2005, 4, 366-377.
Yuan, C.; Zhang, X.; Su, L.; Gao, B.; Shen, L. Facile Synthesis and Self-Assembly of Hierarchical Porous NiO Nano/Micro Spherical Superstructures for High Performance Supercapacitors. J. Mater. Chem. 2009, 19, 5772-5777.
Hou, Y.; Cheng, Y.; Hobson, T.; Liu, J. Design and Synthesis of Hierarchical MnO2 Nanospheres/Carbon Nanotubes/Conducting Polymer Ternary Composite for High Performance Electrochemical Electrodes. Nano Lett. 2010, 10, 2727-2733.
Yuan, C.; Li, J.; Hou, L.; Zhang, X.; Shen, L.; Lou, X. W. Ultrathin Mesoporous NiCo2O4 Nanosheets Supported on Ni Foam as Advanced Electrodes for Supercapacitors. Adv. Funct. Mater. 2012, 22, 4592-4597.
Guan, C.; Liu, J.; Cheng, C.; Li, H.; Li, X.; Zhou, W.; Zhang, H.; Fan, H. J. Hybrid Structure of Cobalt Monoxide Nanowire-Nickel Hydroxidenitrate Nanoflake Aligned on Nickel Foam for High-rate Supercapacitor. Energy Environ. Sci. 2011,4, 4496-4499.
Wang, Y. L.; Zhao, Y. Q.; Xu, C. L.; May, J. 3D Nickel Foam Electrode Be the Promising Choice for Supercapacitors? Solid State Electrochem. 2012, 16, 829-834.

(56) References Cited

OTHER PUBLICATIONS

Huang, J.; Zhu, J.; Cheng, K.; Xu, Y.; Cao, D.; Wang, G. Preparation of Co3O4 Nanowires Grown on Nickel Foam with Superior Electrochemical Capacitance. Electrochimica Acta 2012, 75, 273-278.

Li, H. B.; Yu, M. H.; Wang, F. X.; Liu, P.; Liang, Y.; Xiao, J.; Wang, C. X.; Tong, Y. X.; Yang, G. W. Amorphous Nickel Hydroxide Nanospheres with Ultrahigh Capacitance and Energy Density as Electrochemical Pseudocapacitor Materials. Nat. Commun. 2013, 4, 1894.

Carley, A. F.; Jackson, S. D.; Roberts, M. W.; O'Shea, J. Alkali Metal Reactions with Ni(110)-O and NiO(100) surfaces. Surf. Sci. 2000, 454-456, 141-146.

Ureta-Zañartu, M. S.; Berrios, C.; Pavez, J.; Zagal, J.; Gutiérrez, C.; Marco, J. F. Electrooxidation of 2-Chlorophenol on PolyNiTSPc-Modified Glassy Carbon Electrodes. J. Electroanal. Chem. 2003, 553, 147-156.

Alammar, T.; Shekhah,O.; Wohlgemuth, J.; Mudring, A.-V. Ultrasound-Assisted Synthesis of Mesoporous β-Ni(OH)2 and NiO Nano-Sheets Using Ionic Liquids. J. Mater. Chem. 2012, 22, 18252-18260.

Yang, Y.; Wang, X.; Zhong, C.; Sun, C.; Li, L. Ferroelectric PbTiO3 Nanotube Arrays Synthesized by Hydrothermal Method. Appl. Phys. Lett. 2008, 92, 122907.

Xia, X.; Tu, J.; Mai, Y.; Chen, R.; Wang, X.; Gu, C.; Zhao, X. Graphene Sheet/Porous NiO Hybrid Film for Supercapacitor Applications. Chem. Eur. J. 2011, 17, 10898-10905.

Yang, Y.; Ruan, G.; Xiang, C.; Wang, G.; Tour, J. M. Flexible Three-Dimensional Nanoporous Metal-Based Energy Devices. J. Am. Chem. Soc. 2014, 136, 6187-6190.

Zhang, H.; Zhang, X.; Zhang, D.; Sun, X.; Lin, H.; Wang, C.; Ma, Y. One-Step Electrophoretic Deposition of Reduced Graphene Oxide and Ni(OH)2 Composite Films for Controlled Syntheses Supercapacitor Electrodes. J. Phys. Chem. B 2013, 117, 1616-1627.

Lee, J. W.; Ahn, T.; Kim, J. H.; Ko, J. M.; Kim, J.-D. Nanosheets Based Mesoporous NiO Microspherical Structures via Facile and Template-Free Method for High Performance Supercapacitors. Electrochimica Acta 2011, 56, 4849-4857.

Cao, L.; Kong, L.-B.; Liang, Y.-Y.; Li, H,-L Preparation of Novel Nano-Composite Ni(OH)2/USY Material and Its Application for Electrochemical Capacitance Storage. Chem. Commun. 2004, 1646-1647.

Wang, Q.; Wang, X.; Liu, B.; Yu, G.; Hou, X.; Chen, D.; Shen, G. NiCo2O4 Nanowire Arrays Supported on Ni Foam for High-Performance Flexible All-Solid-State Supercapacitors. J. Mater. Chem. A, 2013, 1, 2468-2473.

Zang, J.; Bao, S.-J.; Li, C. M.; Bian, H.; Cui, X.; Bao, Q.; Sun, C. Q. ; Guo, J.; Lian, K. Well-Aligned Cone-Shaped Nanostructure of Polypyrrole/RuO2 and Its Electrochemical Supercapacitor. J. Phys. Chem. C 2008, 112, 14843-14847.

Lu, X.; Wang, G.; Zhai, T.; Yu, M.; Gan, J.; Tong, Y.; Li, Y. Hydrogenated TiO2 Nanotube Arrays for Supercapacitors. Nano Lett. 2012, 12, 1690-1696.

Yu, Z.; Duong, B.; Abbitt, D.; Thomas, J. Highly Ordered MnO2 Nanopillars for Enhanced Supercapacitor Performance. Adv. Mater. 2013, 25, 3302-3306.

Chou, J.-C.; Chen, Y.-L.; Yang, M.-H.; Chen, Y.-Z.; Lai, C.-C.; Chiu, H.-T.; Lee, C.-Y.; Chueh, Y.-L.; Gan, J.-Y. RuO2/MnO2 Core-Shell Nanorods for Supercapacitors. J. Mater. Chem. A 2013, 1, 8753-8758.

Li, R.; Ren, X.; Zhang, F.; Du, C.; Liu, J. Synthesis of Fe3O4—SnO2 Core-Shell Nanorod Film and Its Application as a Thin-Film Supercapacitor Electrode. Chem. Commun. 2012, 48, 5010-5012.

Xie, et al., "Layer-by-layer-Ni(OH)2/graphene nanohybrids for ultraflexible all-solid-state thin-film supercapacitors with high electrochemical performance," Nano Energy (2013) 2, 65-74.

\* cited by examiner

FIG. 2A
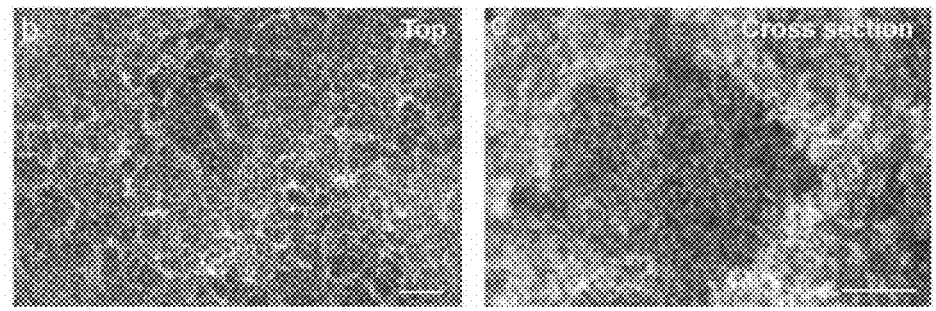
FIG. 2B    FIG. 2C
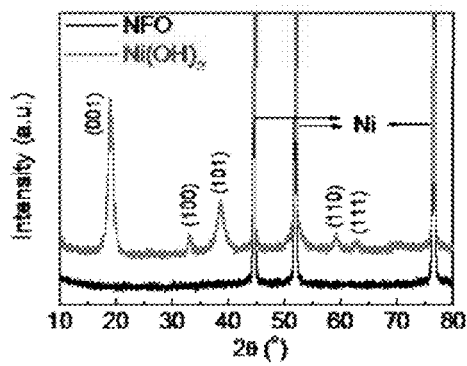    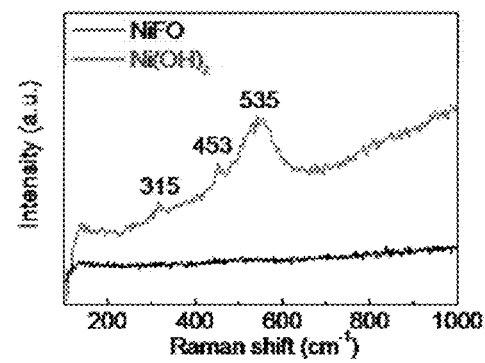
FIG. 2D    FIG. 2E
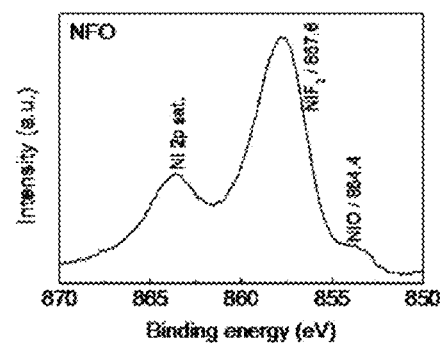    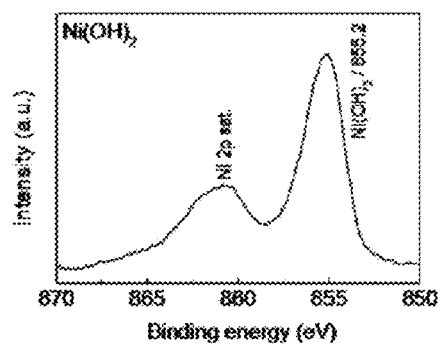
FIG. 2F    FIG. 2G

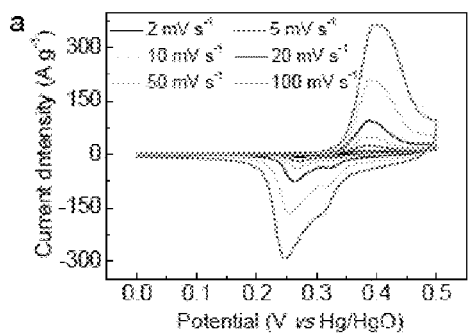
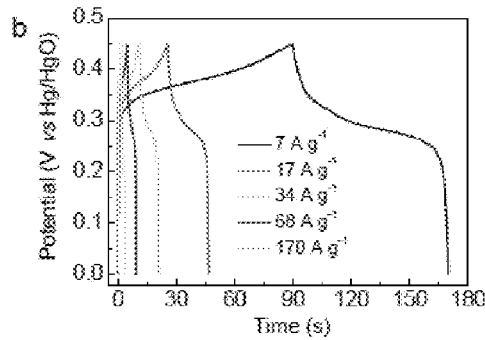
FIG. 6A
FIG. 6B
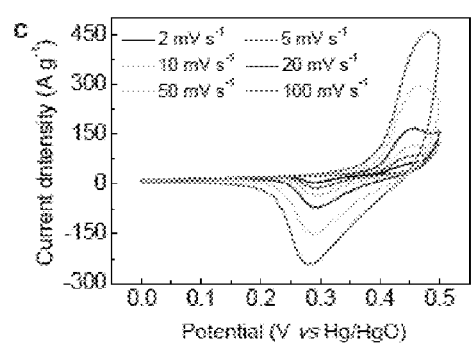
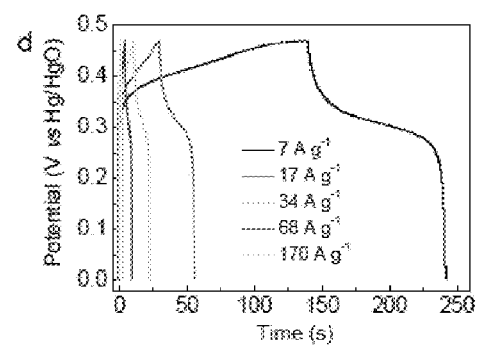
FIG. 6C
FIG. 6D
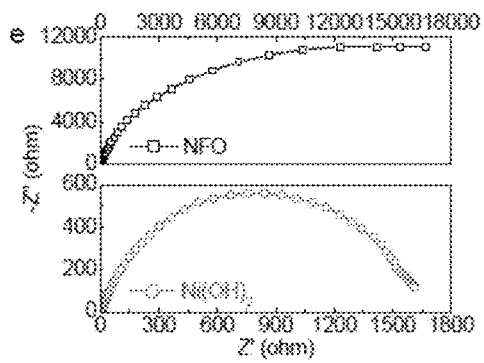
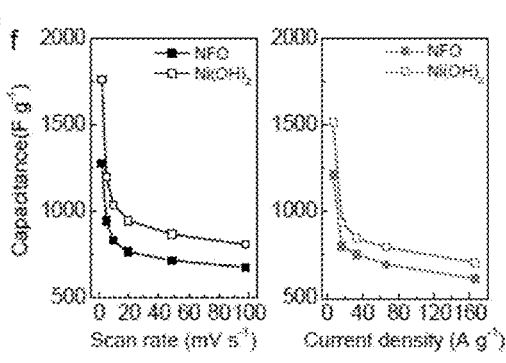
FIG. 6E
FIG. 6F

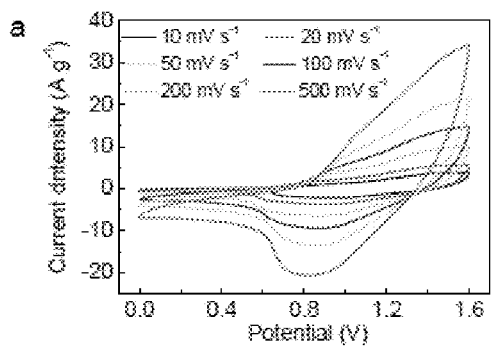
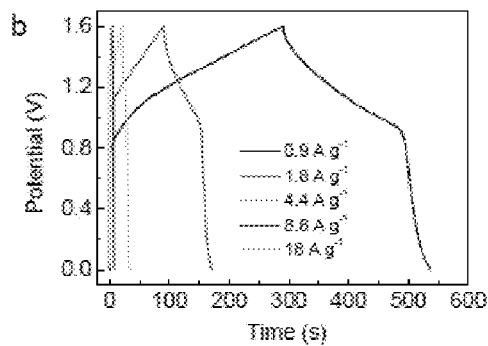
FIG. 8A  FIG. 8B
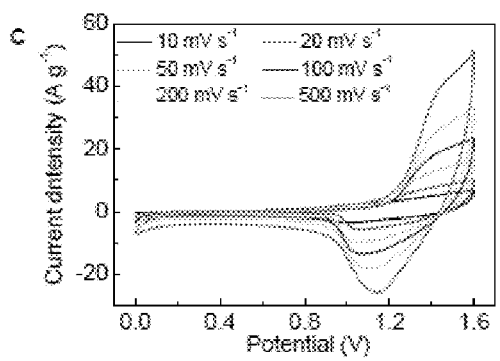
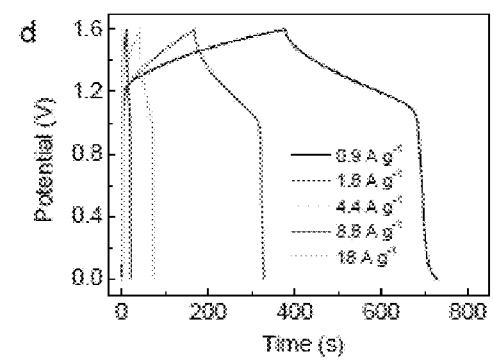
FIG. 8C  FIG. 8D
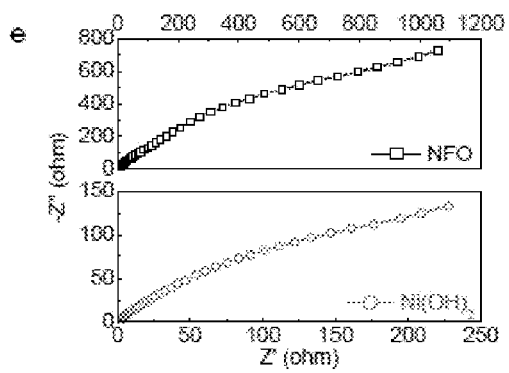
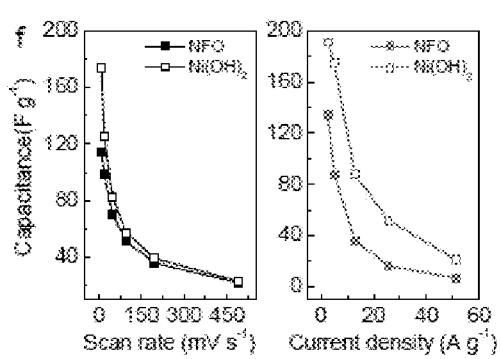
FIG. 8E  FIG. 8F

NI(OH)2 NANOPOROUS FILMS AS ELECTRODES

CROSS-REFERENCE TO RELATED APPLICATIONS

This application claims priority to U.S. Provisional Patent Application No. 62/184,783, filed on Jun. 25, 2015. The entirety of the aforementioned application is incorporated herein by reference.

STATEMENT REGARDING FEDERALLY SPONSORED RESEARCH

This invention was made with government support under Grant No. N00014-09-1-1066, awarded by the U.S. Department of Defense; Grant No. FA9550-12-1-0035, awarded by the U.S. Department of Defense; and Grant No. FA9550-09-1-0581, awarded by the U.S. Department of Defense. The Government has certain rights in the invention.

BACKGROUND

Current electrodes have numerous limitations, including limited energy and power densities. Moreover, current methods of fabricating electrodes are inefficient. The present disclosure addresses the aforementioned limitations.

SUMMARY

In some embodiments, the present disclosure pertains to electrodes that include: (1) a nickel-based material; and (2) at least one porous region with a plurality of nickel hydroxide moieties on a surface of the nickel-based material. In some embodiments, the nickel-based material is a nickel foil that is in the form of a film. In some embodiments, the nickel-based material serves as a current collector.

In some embodiments, the electrodes of the present disclosure are additive-free electrodes that consist essentially of the nickel-based material and the at least one porous region. In some embodiments, the at least one porous region of the electrode is directly associated with the surface of the nickel-based material. In some embodiments, the at least one porous region is derived from the nickel-based material. In some embodiments, the at least one porous region includes a plurality of porous regions scattered throughout the surface of the nickel-based material. In some embodiments, the at least one porous region includes a single porous region that spans an entire surface of the nickel-based material.

In some embodiments, the nickel hydroxide moieties are embedded with the at least one porous region. In some embodiments, the nickel hydroxide moieties are in crystalline form. In some embodiments, the nickel hydroxide moieties are derived from the nickel-based material.

In some embodiments, the electrodes of the present disclosure serve as cathodes or anodes. In some embodiments, the electrodes of the present disclosure have a capacitance ranging from about 1,000 F/g to about 2,500 F/g.

In some embodiments, the electrodes of the present disclosure are a component of an energy storage device. Additional embodiments of the present disclosure pertain to energy storage devices that contain the electrodes of the present disclosure.

In some embodiments, the energy storage devices of the present disclosure include, without limitation, capacitors, batteries, photovoltaic devices, photovoltaic cells, transistors, current collectors, fuel cell devices, water-splitting devices, two electrode systems, three electrode systems, and combinations thereof. In some embodiments, the energy storage device is a capacitor.

In some embodiments, the energy storage devices of the present disclosure have a capacity ranging from about 100 F/g to about 500 F/g. In some embodiments, the energy storage devices of the present disclosure retain at least 90% of their capacity after about 10,000 cycles. In some embodiments, the energy storage devices of the present disclosure have an energy density ranging from about of 10 $\mu Wh/cm^2$ to about 100 $\mu Wh/cm^2$. In some embodiments, the energy storage devices of the present disclosure have a power density ranging from about 1 $mW/cm^2$ to about 100 $mW/cm^2$.

Further embodiments of the present disclosure pertain to methods of fabricating the electrodes of the present disclosure. In some embodiments, the methods of the present disclosure occur by anodizing a nickel-based material to form at least one porous region on a surface of the nickel-based material. Thereafter, the at least one porous region is hydrothermally treated to form a plurality of nickel hydroxide moieties associated with the at least one porous region. In some embodiments, the methods of the present disclosure also include a step of pre-treating (e.g., cleaning) the nickel-based material prior to the anodizing step. In some embodiments, the methods of the present disclosure also include an etching step after the hydrothermal treatment step. In some embodiments, the methods of the present disclosure also include a step of incorporating the formed electrodes into energy storage devices.

DESCRIPTION OF THE FIGURES

FIGS. 2A-G provide schemes and data relating to the fabrication of nickel (Ni)-based electrodes. FIG. 2A shows a schematic for the fabrication process of a three-dimensional (3-D) nanoporous nickel hydroxide $(Ni(OH)_2)$ thin-film. Anodization is done on a Ni-foil in the presence of ammonium fluoride $(NH_4F)$, followed by heating to 100° C. in an autoclave half-filled with aqueous sodium hydroxide (NaOH) (0.1 M). FIGS. 2B-C show top (FIG. 2B) and magnified (FIG. 2C) scanning electron microscopy (SEM) images of the anodically formed nanoporous layer. The scale bar in FIGS. 2B-C denote 200 nm. Also shown are x-ray diffraction (XRD) patterns (FIG. 2D) and Raman spectra (FIG. 2E) of the nickel fluoride/oxide nanoporous layers before (nickel fluoride oxide (NFO), black line) and after $(Ni(OH)_2$, red line) hydrothermal treatment. FIGS. 2F-G show Ni 2p X-ray photoelectron spectroscopy (XPS) spectra of the NFO and $Ni(OH)_2$, respectively.

FIG. 3A shows a cross-sectional image of the nanoporous layer. FIGS. 3B-C show images of the nanoporous layer at different magnifications.

FIGS. 6A-F show data relating to the electrochemical performance of the 3-D nanoporous NFO and $Ni(OH)_2$ thin-film electrodes tested in a three electrode cell. FIG. 6A shows cyclic voltammograms (CVs) of the NFO performed at different scan rates. FIG. 6B shows discharge/charge profiles of the NFO obtained at different current densities. FIG. 6C shows CVs of the Ni(OH)$_2$ performed at different scan rates. FIG. 6D shows discharge/charge profiles of the Ni(OH)$_2$ obtained at different current densities. FIG. 6E shows Nyquist plots of the NFO (black) and Ni(OH)$_2$ (red) nanoporous electrodes. FIG. 6F shows variation of the capacitance vs scan rates (black) and current densities (red).

FIGS. 8A-F show the electrochemical performance of the asymmetric supercapacitors based on the NFO and Ni(OH)$_2$ nanoporous electrodes. FIG. 8A shows the CVs of the NFO performed at different scan rates. FIG. 8B shows the discharge/charge profiles of the NFO obtained at different current densities. FIG. 8C shows the CVs of the Ni(OH)$_2$ performed at different scan rates. FIG. 8D shows the discharge/charge profiles of the Ni(OH)$_2$ obtained at different current densities. FIG. 8E shows the Nyquist plots of the NFO (black) and Ni(OH)$_2$ (red) nanoporous electrodes. FIG. 8F shows the variation of the capacitance vs scan rates (black) and current densities (red).

FIG. 9A shows the Ragone plots of Ni(OH)$_2$ and NFO nanoporous layers. FIG. 9B shows capacitance retention of 10,000 charge/discharge cycles on the nanoporous Ni(OH)$_2$ layer.

DETAILED DESCRIPTION

Figure 1A:
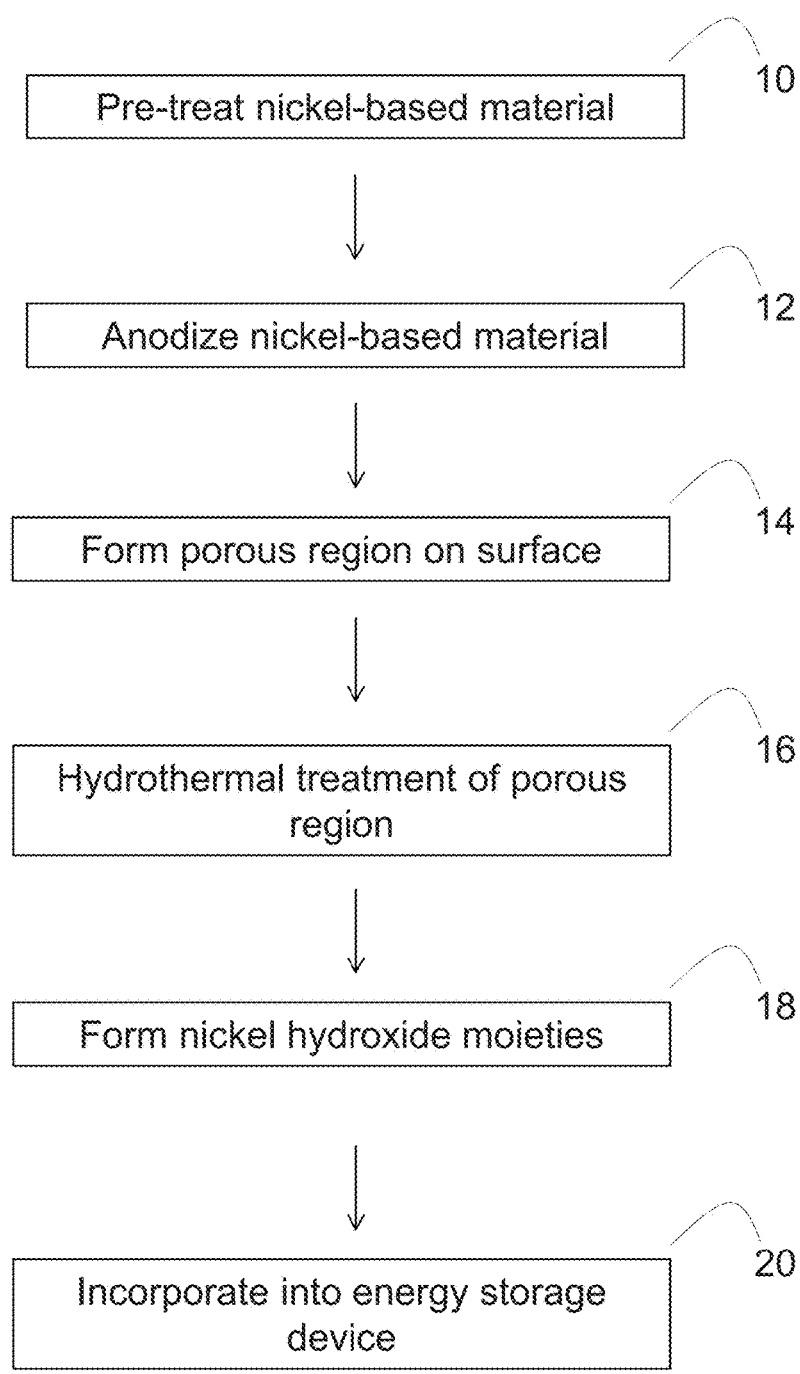
FIGS. 1A-D illustrate the formation of nickel-based electrodes (FIG. 1A), structures of a formed nickel-based electrode (FIGS. 1B-C), and a capacitor that contains the formed nickel-based electrode (FIG. 1D).

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Energy storage devices continue to find applications in many fields. For instance, electrochemical capacitors (ECs) or supercapacitors, including carbon-based non-Faradaic electric double-layer capacitors (EDLCs) and transition metal oxide-based Faradaic pseudocapacitors, have the advantages of fast dynamic response, high power density and long-term cyclability. ECs and EDLCs are often used as advanced energy storage devices to bridge the gap between conventional capacitors and rechargeable batteries.

To expand the potential applications of ECs and other energy storage devices, the design of new electrode materials with both high energy densities and power densities is sought. Enhancement of the specific capacitance of the electrode materials or extending the working potential window are two approaches that are based on the mathematical description of energy density (i.e., $E=\frac{1}{2} CU^2$, where U is the operation potential window).

Extension of the potential window has been most studied due to its quadratic relationship to the energy density. Moreover, organic electrolytes or ionic liquids have been used to replace aqueous electrolytes due to their much wider potential windows (over 2 V) when compared to aqueous electrolytes. Unfortunately, these materials increase the cost of the energy storage devices.

Recently, ECs designed in asymmetric two-electrode configurations by using different electrode materials with unmatched working potential windows have delivered a wider operating voltage of up to 1.6 V in aqueous electrolytes. To that end, transition metal oxides or hydroxides are under consideration to construct asymmetric supercapacitors due to their high theoretical values for the specific capacitance. Among those transition metal oxides and hydroxides, nickel oxide (NiO) and nickel hydroxide (Ni(OH)$_2$) have been studied due to their natural abundance and low cost.

Moreover, in recent years, an approach to enhance specific capacitance in energy storage devices was developed by fabricating hybrid electrode materials that included graphene and carbon nanotubes. Such hybrid electrode materials were combined with electrodes that contain transition metal oxides or hydroxides in order to integrate advantages derived from both materials.

The fabrication of nanoporous metal oxides or hydroxides with high surface areas is another approach to combine non-Faradaic and Faradaic processes into the same material. This would afford improved energy storage device (e.g., capacitor) performance because of the greatly increased number of redox reaction sites in the porous structure and fast ion transport through the channels.

Nonetheless, a need still exists for electrodes that contain high energy densities and high power densities. A need also exists for methods to effectively fabricate such electrodes directly on metal substrates. The present disclosure addresses these needs.

In some embodiments, the present disclosure pertains to methods of fabricating nickel-based electrodes by: (1) anodizing a nickel-based material to form at least one porous region on a surface of the nickel-based material; and (2) hydrothermally treating the at least one porous region to form a plurality of nickel hydroxide moieties associated with the porous region. In more specific embodiments illustrated in FIG. 1A, the methods of the present disclosure include the following steps: pre-treating a nickel-based material (step 10); anodizing the nickel-based material (step 12) to form at least one porous region on a surface of the nickel-based material (step 14); hydrothermally treating the at least one porous region (step 16) to form a plurality of nickel hydroxide moieties associated with the porous region (step 18); and incorporating the formed electrode as a component of an energy storage device (step 20).

In additional embodiments, the present disclosure pertains to nickel-based electrodes that are formed by the methods of the present disclosure. In some embodiments, the nickel-based electrodes include: (1) a nickel-based material; and (2) at least one porous region on a surface of the nickel-based material that contains a plurality of nickel hydroxide moieties. In more specific embodiments illustrated in FIGS.

1B-C, the nickel-based electrodes of the present disclosure are in the form of electrode 30. Electrode 30 includes a nickel-based material 34 with a first surface 32 and a second surface 38. First surface 32 includes a plurality of porous regions 36. Each of the porous regions 36 contains a plurality of nickel hydroxide moieties.

In additional embodiments, the present disclosure pertains to energy storage devices that include the nickel-based electrodes of the present disclosure. In more specific embodiments illustrated in FIG. 1D, the energy storage devices of the present disclosure are in the form of supercapacitor 50. In this embodiment, supercapacitor 50 includes electrodes 52 and 56 between electrolyte layer 54. The nickel-based electrodes of the present disclosure can represent electrode 52, electrode 56, or both electrodes.

As set forth in more detail herein, the present disclosure can have various embodiments. For instance, the electrodes and methods of the present disclosure can utilize various types of nickel-based materials. Moreover, various methods may be utilized to treat the nickel-based materials. Furthermore, the electrodes of the present disclosure can serve as various components of various energy storage devices.

Nickel-Based Materials

The electrodes and methods of the present disclosure can utilize various types of nickel-based materials. For instance, in some embodiments, the nickel-based materials include, without limitation, nickel alloys, nickel foils, nickel foams, nickel plates, porous nickel, nickel coupons, nickel blocks, nickel rods, nickel cylinders, non-porous nickel, and combinations thereof. In some embodiments, the nickel-based material consists essentially of nickel. In some embodiments, the nickel-based material is a nickel foil. In some embodiments, the nickel-based material is non-porous.

The nickel-based materials of the present disclosure can have various purities. For instance, in some embodiments, the nickel-based material is at least 99% pure. In some embodiments, the nickel-based material is at least 99.9% pure. In some embodiments, the nickel-based material is at least 99.99% pure.

The nickel-based materials of the present disclosure can have various shapes. For instance, in some embodiments, the nickel-based materials of the present disclosure may be circular, oval, rectangular, square-like, rolled, coiled, rod-like, cube-like, hexagonal, conformal, or irregular. In some embodiments, the nickel-based materials of the present disclosure may be rectangular.

In some embodiments, the nickel-based materials of the present disclosure are in the form of a film, such as a thin film. In some embodiments, the nickel-based materials of the present disclosure are in the form of a layer.

The nickel-based materials of the present disclosure can also have various sizes. For instance, in some embodiments, the nickel-based materials of the present disclosure may have dimensions that range from a few micrometers to a few meters. In some embodiments, the nickel-based materials of the present disclosure may have dimensions in the micrometer range, the millimeter range, the centimeter range, or the meter range.

The nickel-based materials of the present disclosure can also have various thicknesses. For instance, in some embodiments, the nickel based materials of the present disclosure have a thickness ranging from about 1 µm to about 10 mm. In some embodiments, the nickel based materials of the present disclosure have a thickness ranging from about 50 µm to about 500 µm. In some embodiments, the nickel-based materials of the present disclosure have a thickness ranging from about 100 µm to about 200 µm. In some embodiments, the nickel-based materials of the present disclosure have a thickness of about 125 µm.

The nickel-based materials of the present disclosure can serve various functions. For instance, in some embodiments, the nickel-based materials of the present disclosure serve as a current collector within an electrode. In some embodiments, the nickel-based materials of the present disclosure serve as a conducting framework within an electrode. In some embodiments, the nickel-based materials of the present disclosure serve as support layers for porous regions.

Pre-Treatment of Nickel-Based Materials

In some embodiments, the methods of the present disclosure include a step of pre-treating the nickel-based materials prior to electrode fabrication. For instance, in some embodiments, the pre-treating occurs prior to anodizing the nickel-based materials.

Various methods may be utilized to pre-treat the nickel-based materials of the present disclosure. For instance, in some embodiments, the pre-treating includes a step of cleaning the nickel-based materials. In some embodiments, the cleaning occurs by exposing the nickel-based materials to a cleaning agent. In some embodiments, the cleaning agent can include, without limitation, alcohol (e.g., ethanol or 2-propanol), water (e.g., deionized water), or a stream of gas (e.g., an argon/oxygen gas). In some embodiments, the cleaning occurs by exposing the nickel-based materials to alcohol, such as ethanol. In some embodiments, the cleaning step also includes sonication. In some embodiments, the cleaning occurs by immersing the nickel-based materials in a fresh water bath several times. Additional methods by which to clean the nickel-based materials can also be envisioned.

Anodization of Nickel-Based Materials

Anodization of nickel-based materials generally results in the formation of at least one porous region on a surface of the nickel-based materials. In some embodiments, the anodizing also forms a nickel hydroxide precursor material. In some embodiments, the nickel hydroxide precursor material includes, without limitation, nickel fluoride, nickel nitride, nickel phosphide, nickel bromide, nickel iodide, nickel sulfide, nickel selenide, nickel oxide, and combinations thereof.

In some embodiments, the nickel hydroxide precursor material includes nickel-fluoride. Examples of nickel-fluoride materials are described in an additional PCT application by Applicants, which has been published as WO 2015/179,035. As set forth in more detail herein, anodization can occur under various conditions.

Anodization can occur at various current densities. For instance, in some embodiments, anodization occurs at current densities that range from about 0.1 mA to about 500 mA. In some embodiments, anodization occurs at current densities that range from about 1 mA to about 100 mA. In some embodiment, anodization occurs at a constant current density, such as a constant current density of about 20 mA. In some embodiment, anodization occurs at an intermittent current density.

Anodization can also occur at various voltages. For instance, in some embodiments, anodization occurs at voltages that range from about 1 V to about 100 V. In some embodiments, anodization occurs at voltages that range from about 5 V to about 60 V.

Anodization can also occur for various periods of time. For instance, in some embodiments, anodization occurs for periods of time that range from about 1 minute to about 24 hours. In some embodiments, anodization occurs for periods of time that range from about 1 minute to about 60 minutes. In some embodiments, anodization occurs for about 20 minutes.

Anodization can occur in the presence of various compositions. For instance, in some embodiments, anodization occurs in the presence of organic electrolytes, inorganic electrolytes, ionic liquids, ammonium fluoride, ethylene glycol, and compositions thereof.

Hydrothermal Treatment of Porous Regions of Nickel-Based Materials

Hydrothermal treatment of porous regions of nickel-based materials generally results in the formation of a plurality of nickel hydroxide moieties associated with the porous region. In some embodiments, the hydrothermal treatment forms the nickel hydroxide moieties by converting nickel hydroxide precursor materials (e.g., nickel fluoride or nickel oxide) to nickel hydroxide. As set forth in more detail herein, hydrothermal treatment can occur under various conditions.

Hydrothermal treatment can occur at various temperatures. For instance, in some embodiments, hydrothermal treatment can occur at temperatures that range from about 50° C. to about 500° C. In some embodiments, hydrothermal treatment can occur at temperatures that range from about 75° C. to about 500° C. In some embodiments, hydrothermal treatment can occur at temperatures that range from about 100° C. to about 500° C. In some embodiments, hydrothermal treatment can occur at temperatures that range from about 100° C. to about 200° C. In some embodiments, hydrothermal treatment can occur at temperatures of more than about 100° C. In some embodiments, hydrothermal treatment can occur at temperatures of about 100° C.

Hydrothermal treatment can occur in various environments. For instance, in some embodiments, hydrothermal treatment occurs in a pressurized environment, such as an autoclave or a vacuum. In some embodiments, hydrothermal treatment occurs in the presence of a protic solvent. In some embodiments, the protic solvent includes, without limitation, sodium hydroxide, formic acid, butanol, isopropanol, nitromethane, ethanol, methanol, acetic acid, water, and combinations thereof. In some embodiments, the protic solvent includes sodium hydroxide.

Etching

In some embodiments, the methods of the present disclosure can also include an etching step. In some embodiment, the etching step can be utilized to tailor the pore size and thickness of the porous regions of the nickel-based materials.

The etching step can occur at various times. For instance, in some embodiments, etching can occur during or after a hydrothermal treatment step. In some embodiments, etching can occur during or after an anodization step.

The etching step can occur by various methods. For instance, in some embodiments, the etching occurs by at least one of reactive ion etching, physical sputtering, gas phase chemical etching, and combinations thereof. In some embodiments, the etching occurs by reactive ion etching. In some embodiments, the etching occurs by electrochemical etching.

In some embodiments, etching occurs under the flow of one or more gases. In some embodiments, the gases may include, without limitation, $CF_4$, $CHF_3$, $SF_6$, $Cl_2$, $BCl_3$, oxygen, argon, hydrogen, nitrogen, and combinations thereof.

Etching can occur for various periods of time. For instance, in some embodiments, the etching lasts from about 5 seconds to about 48 hours. In some embodiments, the etching lasts from about 5 seconds to about 60 seconds. Additional etching times can also be envisioned.

Electrode Compositions

The methods of the present disclosure can be utilized to form various types of electrodes. In general, the electrodes of the present disclosure include a nickel-based material; and at least one porous region on a surface of the nickel-based material that includes a plurality of nickel hydroxide moieties. In some embodiments, the electrodes of the present disclosure consist essentially of the nickel-based material and the porous region. For instance, in some embodiments, the electrodes of the present disclosure lack any additives. In some embodiments, the electrodes of the present disclosure lack any binders. In some embodiments, the electrodes of the present disclosure lack any additional current collectors or conducting carbon.

Porous Regions

Figure 1B:
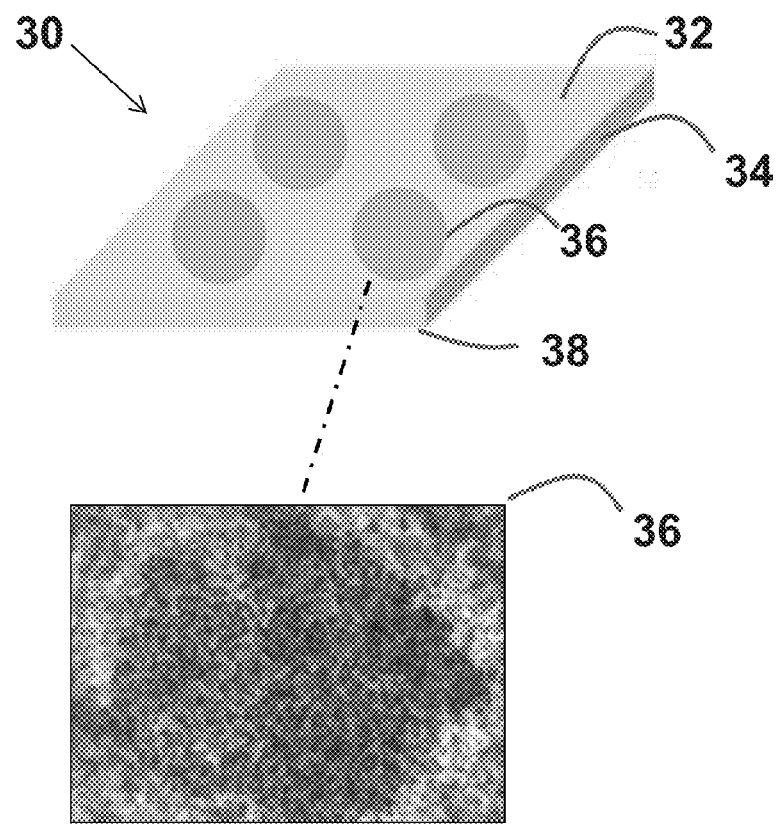
Figure 1C:
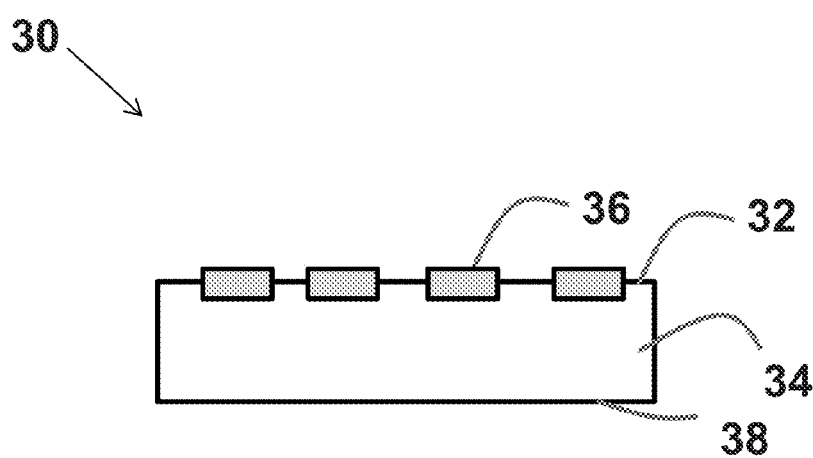

The electrodes of the present disclosure can include various porous regions with various arrangements on a surface of a nickel-based material. In some embodiments, the porous regions are derived directly from the nickel-based material, such as through hydrothermal formation. In some embodiments, the porous region is directly associated with a surface of a nickel-based material. In some embodiments, the porous region includes a plurality of porous regions that are scattered throughout an entire surface of a nickel-based material (e.g., porous regions 36 on surface 32, as illustrated in FIGS. 1B-C). In some embodiments, a single porous region spans an entire surface of a nickel-based material.

In some embodiments, porous regions are only located on a single surface of a nickel-based material (e.g., first surface 32, as illustrated in FIGS. 1B-C). In other embodiments, porous regions are located on multiple surfaces of a nickel-based material. In some embodiments, porous regions are located on opposite surfaces of a nickel-based material (e.g., opposite surfaces 32 and 38, as illustrated in FIGS. 1B-C).

The porous regions of the present disclosure can also have various structures. For instance, in some embodiments, the porous regions have a three-dimensional structure. In some embodiments, the porous regions have a foam-like structure. In some embodiments, the porous regions have a sponge-like structure. In some embodiments, the porous regions have a flake-like structure. In some embodiments, the porous regions have a conformal structure.

In some embodiments, porous regions are free-standing without the nickel-based material. In some embodiments, porous regions are in the form of layers on a surface of a nickel-based material. In some embodiments, porous regions are embedded with the nickel nickel-based material. In some embodiments, porous regions are inseparable from the nickel-based material.

The porous regions of the present disclosure can also have various pore sizes. For instance, in some embodiments, the porous regions include pores with sizes that range from about 1 nm in diameter to about 1 μm in diameter. In some embodiments, the porous regions include pores with sizes ranging from about 1 nm in diameter to about 500 nm in diameter. In some embodiments, the porous regions include pores with sizes ranging from about 5 nm in diameter to about 100 nm in diameter. In some embodiments, the porous regions include pores with sizes ranging from about 2 nm in diameter to about 100 nm in diameter. In some embodiments, the porous regions include pores with sizes ranging from about 4 nm in diameter to about 50 nm in diameter. In some embodiments, the porous regions include pores with sizes of about 10 nm in diameter. In some embodiments, the porous regions include pores with sizes of about 5 nm in diameter. In some embodiments, the porous regions include pores with sizes of less than about 5 nm in diameter.

The porous regions of the present disclosure can also have various thicknesses. For instance, in some embodiments, the porous regions include a thickness ranging from about 50 nm to about 500 µm. In some embodiments, the porous regions have a thickness ranging from about 50 nm to about 100 µm. In some embodiments, the porous regions have a thickness ranging from about 100 nm to about 50 µm. In some embodiments, the porous regions have a thickness ranging from about 150 nm to about 200 nm.

Nickel Hydroxide Moieties

The porous regions of the present disclosure can be associated with nickel hydroxide moieties in various manners. In some embodiments, the nickel hydroxide moieties are derived from the nickel-based material. In some embodiments, the nickel hydroxide moieties are embedded with the porous regions. In some embodiments, the nickel hydroxide moieties are on the porous regions. In some embodiments, the nickel hydroxide moieties are within the porous regions. In some embodiments, the nickel hydroxide moieties are inseparable from the porous regions.

The nickel hydroxide moieties may be in various forms. For instance, in some embodiments, the nickel hydroxide moieties are in at least one of crystalline form, semi-crystalline form, amorphous form, lattice form, and combinations of such forms. In some embodiments, the nickel hydroxide moieties are in a crystalline form. In some embodiments, the nickel hydroxide moieties are in the form of a lattice. In some embodiments, the nickel hydroxide moieties are in a semi-crystalline form. In some embodiments, the nickel hydroxide moieties are in an amorphous form.

Electrode Structures

The electrodes of the present disclosure can have various structures. For instance, in some embodiments, the electrodes of the present disclosure are in the form of films, sheets, papers, mats, scrolls, conformal coatings, foams, sponges, blocks, coupons, rods, cylinders, and combinations thereof. In some embodiments, the electrodes of the present disclosure have a three-dimensional structure (e.g., foams and sponges). In some embodiments, the electrodes of the present disclosure have a two-dimensional structure (e.g., films, sheets and papers). In some embodiments, the electrodes of the present disclosure are in the form of flexible electrodes.

Electrode Functions

The electrodes of the present disclosure can serve various functions. For instance, in some embodiments, the electrodes of the present disclosure can serve as an anode. In some embodiments, the electrodes of the present disclosure can serve as a cathode. In some embodiments, the electrodes of the present disclosure serve as a cathode and an anode. In some embodiments, the electrodes of the present disclosure can be used as binder-free and additive-free electrodes.

Electrode Properties

The electrodes of the present disclosure can have various advantageous properties. For instance, in some embodiments, the electrodes of the present disclosure have a capacitance ranging from about 1,000 F/g to about 2,500 F/g. In some embodiments, the electrodes of the present disclosure have a capacitance ranging from about 1,500 F/g to about 2,000 F/g. In some embodiments, the electrodes of the present disclosure have a capacitance ranging from about 1,500 F/g to about 1,800 F/g. In some embodiments, the electrodes of the present disclosure have a capacitance of about 1,800 F/g.

Energy Storage Devices

The methods of the present disclosure can also include a step of incorporating the electrodes of the present disclosure as a component of an energy storage device. Additional embodiments of the present disclosure pertain to energy storage devices that contain the electrodes of the present disclosure.

The electrodes of the present disclosure can be utilized as components of various energy storage devices. For instance, in some embodiments, the energy storage device includes, without limitation, capacitors, batteries, photovoltaic devices, photovoltaic cells, transistors, current collectors, fuel cell devices, water-splitting devices, two electrode systems, three electrode systems, and combinations thereof.

Figure 1D:
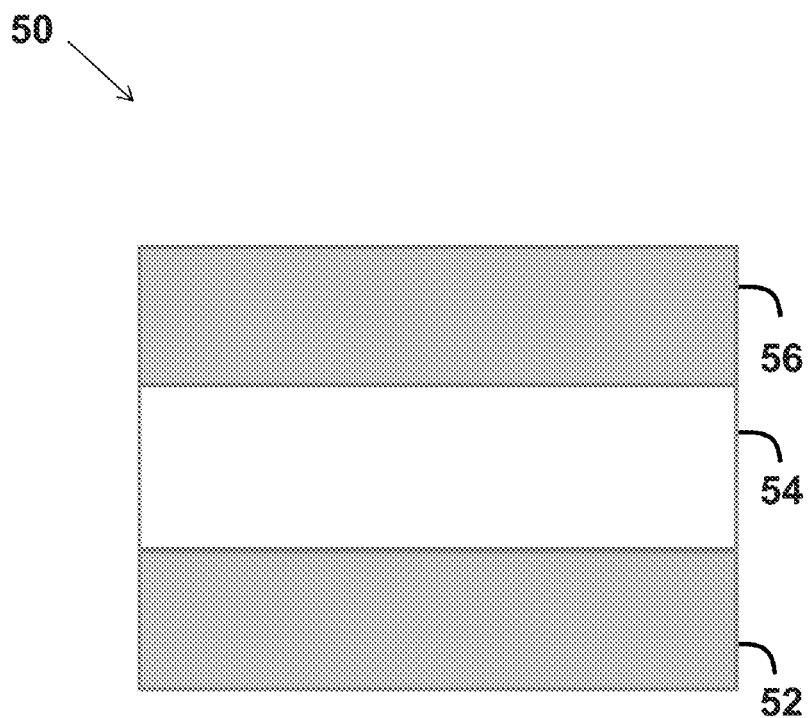

In some embodiments, the energy storage device is a capacitor (e.g., capacitor 50 in FIG. 1D). In some embodiments, the capacitor includes, without limitation, lithium-ion capacitors, supercapacitors, asymmetric supercapacitors, asymmetric two electrode supercapacitors, additive-free electrode supercapacitors, micro supercapacitors, pseudo capacitors, electrochemical capacitors, two-electrode electric double-layer capacitors (EDLC), non-Faradaic electric double-material capacitors (EDLCs), Faradaic pseudocapacitors, and combinations thereof. In some embodiments, the capacitor is a lithium-ion capacitor.

In some embodiments, the energy storage device is a battery. In some embodiments, the battery includes, without limitation, rechargeable batteries, non-rechargeable batteries, micro batteries, lithium-ion batteries, lithium-sulfur batteries, lithium-air batteries, sodium-ion batteries, sodium-sulfur batteries, sodium-air batteries, magnesium-ion batteries, magnesium-sulfur batteries, magnesium-air batteries, aluminum-ion batteries, aluminum-sulfur batteries, aluminum-air batteries, calcium-ion batteries, calcium-sulfur batteries, calcium-air batteries, zinc-ion batteries, zinc-sulfur batteries, zinc-air batteries, and combinations thereof. In some embodiments, the energy storage device is a lithium-ion battery.

In some embodiments, the energy storage devices that contain the electrodes of the present disclosure may also contain electrolytes (e.g., electrolytes 54 in capacitor 50, as illustrated in FIG. 1D). In some embodiments, the electrolytes include, without limitation, non-aqueous solutions, aqueous solutions, salts, solvents, ionic liquids, additives, composite materials, and combinations thereof. In some embodiments, the electrolytes include, without limitation, lithium hexafluorophosphate (LiPF$_6$), lithium (trimethylfluorosulfonyl) imide (LITFSI), lithium (fluorosulfonyl) imide (LIFSI), lithium bis(oxalate)borate (LiBOB), hexamethylphosphoustriamide (HMPA), and combinations thereof. In some embodiments, the electrolytes are in the form of a composite material. In some embodiments, the electrolytes include solvents, such as ethylene carbonate, diethyl carbonate, dimethyl carbonate, ethyl methyl carbonate, 1,2-dimethoxyl methane, and combinations thereof.

The electrodes of the present disclosure can provide various advantageous properties in energy storage devices. For instance, in some embodiments, the energy storage devices of the present disclosure have a capacity ranging from about 100 F/g to about 500 F/g. In some embodiments, the energy storage devices of the present disclosure have a capacity ranging from about 100 F/g to about 200 F/g. In some embodiments, the energy storage devices of the present disclosure have a capacity ranging from about 175 F/g to about 200 F/g.

The energy storage devices of the present disclosure can also have advantageous capacity retention properties. For instance, in some embodiments, the energy storage devices of the present disclosure retain at least 90% of their capacity after about 10,000 cycles. In some embodiments, the energy storage devices of the present disclosure retain at least 95% of their capacity after about 10,000 cycles.

The energy storage devices of the present disclosure can also have advantageous energy densities. For instance, in some embodiments, the energy storage devices of the present disclosure have energy densities ranging from about 10 $\mu Wh/cm^2$ to about 100 $\mu Wh/cm^2$. In some embodiments, the energy storage devices of the present disclosure have energy densities ranging from about 25 $\mu Wh/cm^2$ to about 50 $\mu Wh/cm^2$. In some embodiments, the energy storage devices of the present disclosure have energy densities ranging from about 40 $\mu Wh/cm^2$ to about 50 $\mu Wh/cm^2$.

The energy storage devices of the present disclosure can also have advantageous power densities. For instance, in some embodiments, the energy storage devices of the present disclosure have power densities ranging from about 1 $mW/cm^2$ to about 100 $mW/cm^2$. In some embodiments, the energy storage devices of the present disclosure have power densities ranging from about 10 $mW/cm^2$ to about 100 $mW/cm^2$. In some embodiments, the energy storage devices of the present disclosure have power densities ranging from about 10 $mW/cm^2$ to about 50 $mW/cm^2$. In some embodiments, the energy storage devices of the present disclosure have power densities ranging from about 25 $mW/cm^2$ to about 50 $mW/cm^2$.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Hydrothermally Formed Three-Dimensional Nanoporous Ni(OH)$_2$ Thin-Film Supercapacitors In this Example, a three-dimensional (3-D) nanoporous nickel hydroxide (Ni(OH)$_2$) thin-film was hydrothermally converted from an anodically formed porous layer of nickel fluoride/oxide. The nanoporous Ni(OH)$_2$ thin-films can be used as additive-free electrodes for energy storage. The nanoporous layer delivers a high capacitance of 1765 F g$^{-1}$ under three electrode testing. After assembly with porous activated carbon in asymmetric supercapacitor configurations, the devices delivered optimal supercapacitive performances, with capacitances of 192 F g$^{-1}$, energy densities of 68 Wh kg$^{-1}$ and power density of 44 kW kg$^{-1}$. The wide working potential window (up to 1.6 V in 6 M aq KOH) and stable cyclability (~90% capacitance retention over 10,000 cycles) make the thin-films ideal for practical supercapacitor devices.

Figure 3A:
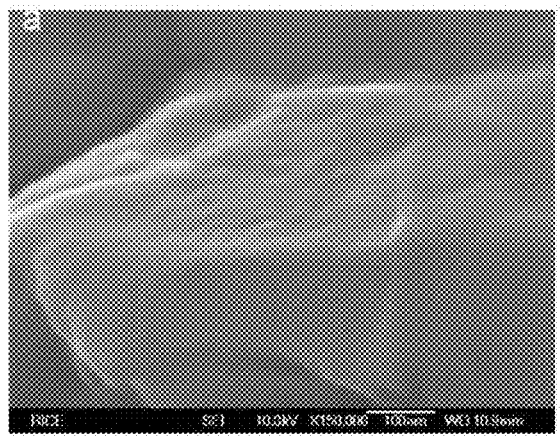
FIGS. 3A-C show SEM images of the 3-D nanoporous nickel fluoride/oxide layers.
Figure 3B:
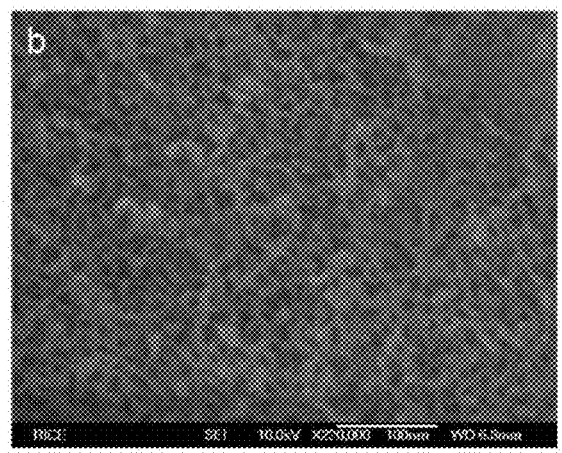
Figure 3C:
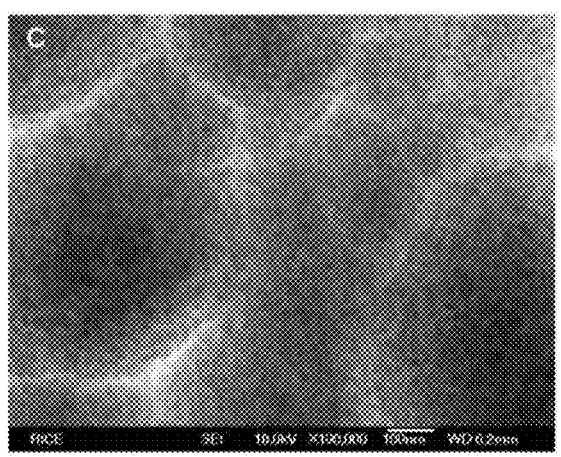

As illustrated in FIG. 2A, electrochemical anodic treatments on nickel (Ni) foils were used to form a 3-D nanoporous Ni-based thin-film. Microscopy analysis (FIGS. 2B-C and 3) show that the as-prepared anodic thin-film has a 3-D nanoporous structure throughout the entire layer with a pore size of about 10 nm.

Figure 4A:
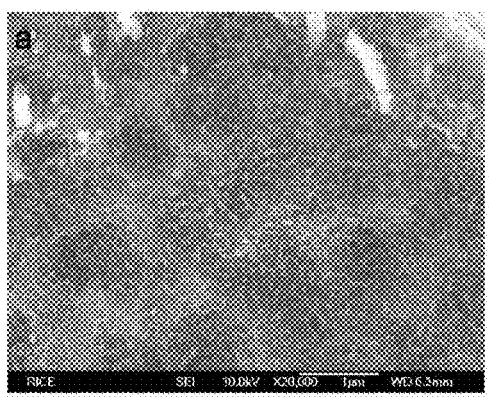
FIGS. 4A-B show SEM images of the 3-D nanoporous $Ni(OH)_2$ layers at magnifications of 20,000× (FIG. 4A) and 100,000× (FIG. 4B).
Figure 4B:
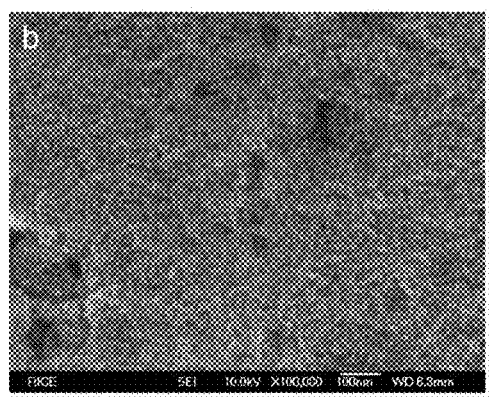

A thinner porous layer can, to some extent, reduce the electrode resistance and enhance the electrochemical capacitor (EC) performances. A thin-film with a thickness of 150 to 200 nm (FIG. 3A) was fabricated and investigated in this Example. After hydrothermal treatment, the 3-D nanoporous thin-film still maintains its porous morphology without observable damage or blocking of the nanopores (FIGS. 4A-B).

Figure 5:
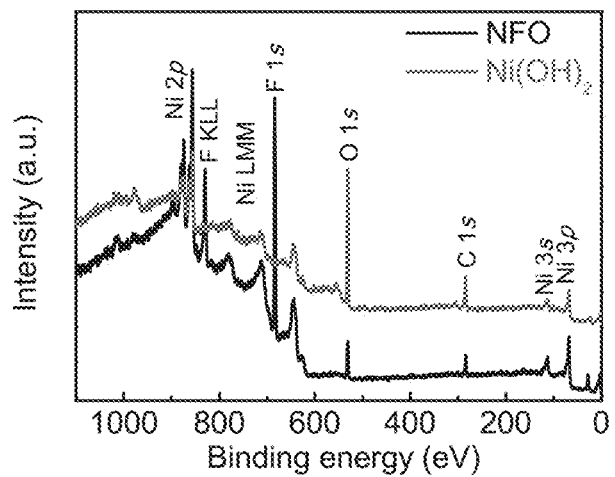
FIG. 5 shows XPS patterns of the nickel fluoride/oxide nanoporous layers before (NFO, black line) and after (Ni $(OH)_2$, red line) hydrothermal treatment.

The crystalline structure and chemical composition of the 3-D nanoporous thin-film were investigated by X-ray diffraction (XRD, FIG. 2D), Raman spectrum (FIG. 2E) and X-ray photoelectron spectroscopy (XPS, FIGS. 2F-G and 5). The anodically formed nanoporous thin-film shows an amorphous phase, which is composed of Ni, F and O (nickel fluoride/oxide composite, NFO). The amorphous NFO was converted to highly crystalline Ni(OH)$_2$ (PDF #00-014-0117) after the hydrothermal treatment. From Raman analyses, typical bands for Ni(OH)$_2$ at 315, 453 and 535 cm$^{-1}$ were identified after hydrothermal treatment. The conversion from NFO to Ni(OH)$_2$ was also supported by fitting the XPS Ni 2p spectra (FIGS. 2F-G). The peak at 854.4 eV in FIG. 2F is attributed to NiO, while the peak at 857.6 eV is from NiF$_2$. The peak at 855.2 eV in the XPS spectrum of the hydrothermally treated sample is attributed to Ni(OH)$_2$.

Without being bound by theory, it is envisioned that the conversion from amorphous NFO to highly crystalline Ni(OH)$_2$ is based on the in situ hydrothermal formation mechanism under a high pressure/temperature atmosphere. Possible reactions to form Ni(OH)$_2$ include: NiF$_2$+2NaOH→Ni(OH)$_2$+2NaF.

To test the EC performances of the nanoporous NFO and Ni(OH)$_2$, three electrode testing (FIGS. 6A-F) was performed in 6 M aq KOH electrolyte with Pt and Hg/HgO as counter and reference electrodes, respectively. From the cyclic voltammograms (CVs) of NFO (FIG. 6A), the anodic peak at 0.39 V (vs Hg/HgO) and the cathodic peak at 0.27 V (vs Hg/HgO) can be assigned to the following redox reaction: NiO+OH$^-$⇌NiOOH+e$^-$. Another cathodic peak at 0.33 V (vs Hg/HgO) is likely from NiF$_2$ in the nanoporous layer. The calculated capacitance of the NFO calculated from the CV at 2 mV s$^{-1}$ is 1280 F g$^{-1}$.

Galvanostatic discharge/charge (GDC, FIG. 6B) curves of the NFO at different current densities from 7 to 170 A g$^{-1}$ show deviation from the typical triangular shape of EDLCs that indicates the Faradaic characteristics of the charge storage. The shoulders in the GDC graphs at 0.4 V (vs Hg/HgO) during charging and 0.3 V (vs Hg/HgO) during discharging indicate the redox reactions which are consistent with the CVs.

The capacitance of the NFO calculated from GDC curves at a current density of 7 A g$^{-1}$ is 1215 F g$^{-1}$. From CVs of the Ni(OH)$_2$ nanoporous layer (FIG. 6C), a pair of redox reaction peaks at 0.45 V (vs Hg/HgO) and 0.29 V (vs Hg/HgO) is evident, which represents the following redox reaction: Ni(OH)$_2$+OH$^-$⇌NiOOH+H$_2$O+e$^-$.

The capacitance of the Ni(OH)$_2$ calculated from the CV at 2 mV s$^{-1}$ is 1765 F g$^{-1}$. Compared with the CVs of the NFO, the redox reaction peaks of the Ni(OH)$_2$ shift positively, which indicates that a wider potential window can be anticipated without water electrolysis. The GDC curves of the Ni(OH)$_2$ show similar shape to the NFO but with a slightly elevated discharge/charge plateau, which is consistent with CVs. The capacitance of the Ni(OH)$_2$ calculated from GDC curves at a current density of 7 A g$^{-1}$ is 1519 F g$^{-1}$.

Figure 7:
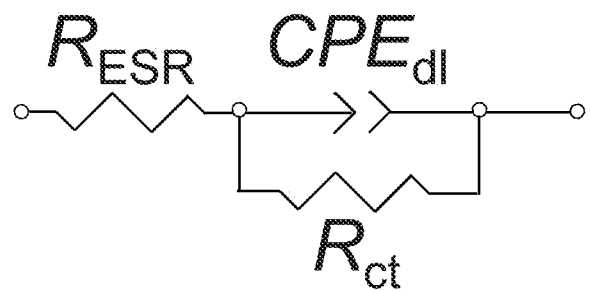
FIG. 7 shows the equivalent circuit used to simulate Nyquist plots.

Further investigations on the EC performance of the 3-D nanoporous layers in three electrode cells were performed using electrochemical impedance spectroscopy (EIS). By simulating EIS data according to the equivalent circuit in FIG. 7, the Nyquist plots of the nanoporous layers (FIG. 6E) can be divided into two portions. First, at high frequency, the intercept at the real axis represents the equivalent series resistance ($R_{ESR}$), which is a combination of ionic resistance of the electrolytes, electronic resistance of the electrode materials and interface resistance. Second, the semicircle observed at the high-to-medium frequency region corresponds to the charge-transfer resistance ($R_{ct}$), which is related to the Faradaic reactions and the electric double-layer capacitance ($CPE_{dl}$) at the electrode/electrolyte interfaces. For pseudocapacitors, $R_{ESR}$ and $R_{ct}$ are more informative because they reflect the electrical characteristics of the electrodes.

Both nanoporous NFO and Ni(OH)$_2$ have low $R_{ESR}$ on the same order of magnitude, 1.28±0.02Ω and 3.13±0.02Ω, respectively, which indicates less internal resistance in the EC devices. Furthermore, $R_{ct}$ for NFO and Ni(OH)$_2$ were calculated to be 28.56±0.008Ω and 1.63±0.006 kΩ, respectively. The greatly reduced $R_{ct}$ in the nanoporous Ni(OH)$_2$ indicates its improved electrical conductivity and fast Faradaic/redox reactions after the hydrothermal treatment. The capacitance of the Ni(OH)$_2$ is enhanced at different discharge/charge rates (FIG. 6F), which also indicates an improved EC performance after hydrothermal treatment.

To access the practical supercapacitor device performance of the fabricated nanoporous layers, asymmetric two electrode cells were assembled using 6 M aq KOH as the electrolyte and porous activated carbon as the negative electrodes. The EC behavior of the samples was evaluated by calculating the specific capacitance of the entire device, including both positive and negative electrodes from CVs and GDCs. Electrochemical characterizations were performed within a potential window between 0 and 1.6 V.

From the CVs of NFO at different scan rates from 10 mV s$^{-1}$ to 500 mV s$^{-1}$ (FIG. 8A), an anodic peak at 1.2 V and a cathodic peak at 1.0 V can be assigned to the following redox reaction: $NiO+OH^- \leftrightarrows NiOOH+e^-$. The capacitance calculated from the CV at a scan rate of 10 mV s$^{-1}$ is 114 F g$^{-1}$. GDC tests on the NFO were performed at current densities from 0.9 to 18 A g$^{-1}$ (FIG. 8B). The shoulders at 1.2 V during the charging and 1.0 V during the discharging indicate the redox reactions which are consistent with the CVs. The discharge capacitance at 0.9 A g$^{-1}$ is calculated to be 135 F g$^{-1}$. After hydrothermal treatment to Ni(OH)$_2$, the measured CVs (FIG. 8C) and GDC curves (FIG. 8D) of the nanoporous Ni(OH)$_2$ show positively shifted redox reactions compared with NFO.

Redox reactions occurred at 1.4 V (anodic) and 1.1 V (cathodic), representing the following formula: $Ni(OH)_2 + OH^- \leftrightarrows NiOOH+H_2O+e^-$. Furthermore, the capacitance of the Ni(OH)$_2$ calculated from the CV at 10 mV s$^{-1}$ and GDC curve at 0.9 A g$^{-1}$ are 174 and 192 F g$^{-1}$, respectively. To have a better understanding of the EC performances of the nanoporous layers, EIS was also performed on the asymmetric supercapacitor devices (FIG. 8E).

In the supercapacitor devices based on both nanoporous NFO and Ni(OH)$_2$, low $R_{ESR}$~0.64±0.03Ω and 0.57±0.04Ω, respectively, are obtained. Furthermore, $R_{ct}$ for NFO and Ni(OH)$_2$ were calculated to be 833.5±0.6Ω and 175.9±0.4Ω, respectively. Even after assembly into asymmetric supercapacitors, the Ni(OH)$_2$ still has greatly reduced resistance when compared with NFO. Furthermore, at different discharge/charge rates (FIG. 8F), Ni(OH)$_2$ also delivers enhanced EC performance after hydrothermal treatment.

Figure 9A:
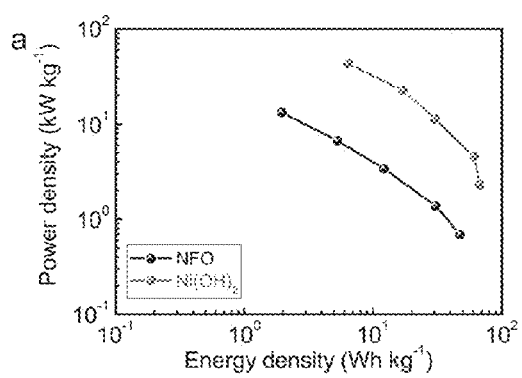
FIGS. 9A-B show additional data relating to nickel-based electrodes.

The advanced ECs performance of the fabricated devices that use the nanoporous NFO and Ni(OH)$_2$ as electrodes are also reflected by their energy and power densities, as shown in the Ragone plot (FIG. 9A). The maximum energy density ($E_{max}$) and power density ($P_{max}$) of the nanoporous NFO were calculated to be 48 Wh kg$^{-1}$ and 14 kW kg$^{-1}$, respectively. The nanoporous Ni(OH)$_2$ gave values for $E_{max}$ of 68 Wh kg$^{-1}$ and $P_{max}$ of 44 kW kg$^{-1}$.

Figure 9B:
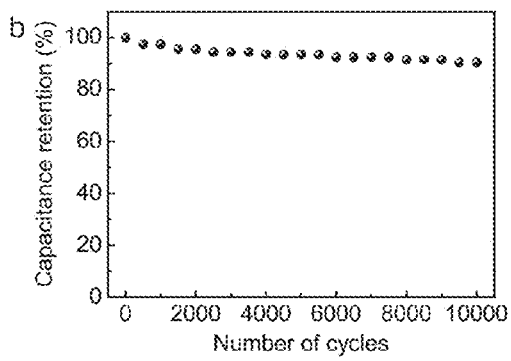
Figure 10A:
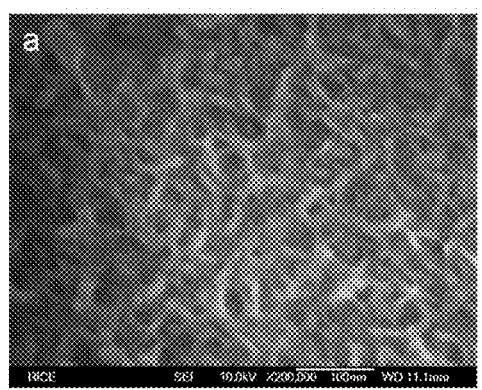
FIGS. 10A-B show SEM images of the nanoporous Ni(OH)$_2$ electrodes after 10,000 cycles of discharge/charge testing at magnifications of 200,000× (FIG. 10A) and 100,000× (FIG. 10B).
Figure 10B:
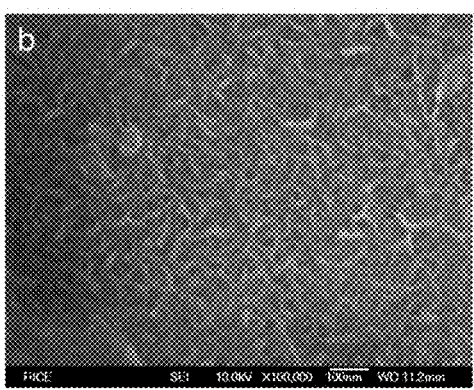

Considering the capacitance of NFO and Ni(OH)$_2$ obtained both in three electrode and two electrode testing, the fabricated nanoporous layers deliver optimal EC performances compared to carbonaceous materials and most other state-of-the-art nanostructured supercapacitors based on NiO and Ni(OH)$_2$ (Table 1). Moreover, the devices were tested at 18 A g$^{-1}$ for cyclability by running them through 10,000 discharge/charge cycles. More than 90% retention was obtained (FIG. 9B) without apparent changes in the 3-D nanoporous structure of Ni(OH)$_2$ after testing (FIGS. 10A-B).

TABLE 1

Supercapacitor performance comparison between the current work and some recent reports (S1: *Angew. Chem.* 2011, 123, 6979-6982; S2: *ACS Appl. Mater. Interfaces* 2013, 5, 1596-1603; S3: *Chem. Commun.* 2008, 35, 4213-4215; S4: *Nano Lett.* 2010, 10, 4099-4104; S5: *Adv. Energy Mater.* 2012, 10, 1188-1192; S6: *J. Am. Chem. Soc.* 2010, 132, 7472-7477; S7: *Adv. Funct. Mater.* 2012, 22, 2632-2641; S8: *ACS Nano* 2013, 7, 6237-6243; S9: *ACS Appl. Mater. Interfaces* 2013, 5, 2446-2454; S10: *J. Mater. Chem. A* 2013, 1, 4793-4803).

| Electrodes | Capacitance-three electrode (F g$^{-1}$) | Capacitance-two electrode (F g$^{-1}$) | $E_{max}$ (Wh kg$^{-1}$) | $P_{max}$ (kW kg$^{-1}$) | Reference |
|---|---|---|---|---|---|
| NiO/NiF$_2$ nanoporous layer | 1280 | 135 | 48 | 14 | This Example |
| Ni(OH)$_2$ nanoporous layer | 1765 | 192 | 68 | 44 | This Example |
| NiO/Ni nanocomposites | 900 | — | 60 | 10 | S1 |
| NiO nanonetwork | 480 | — | — | — | S2 |
| NiO nano-flakes | 942 | — | — | — | S3 |
| NiO-TiO$_2$ nanotubes | 120-300 | — | — | — | S4 |
| NiO nanobelts | 600 | — | — | — | S5 |
| Ni(OH)$_2$ nanoplates | 1335 | — | 37 | 10 | S6 |
| Ni(OH)$_2$/Graphene | 1735 | 218.4 | 77.8 | 15.2 | S7 |
| Ni(OH)$_2$ thin film | 1560 | 119 | 13.4 | 85 | S8 |

TABLE 1-continued

Supercapacitor performance comparison between the current work and some recent reports (S1: *Angew. Chem.* 2011, 123, 6979-6982; S2: *ACS Appl. Mater. Interfaces* 2013, 5, 1596-1603; S3: *Chem. Commun.* 2008, 35, 4213-4215; S4: *Nano Lett.* 2010, 10, 4099-4104; S5: *Adv. Energy Mater.* 2012, 10, 1188-1192; S6: *J. Am. Chem. Soc.* 2010, 132, 7472-7477; S7: *Adv. Funct. Mater.* 2012, 22, 2632-2641; S8: *ACS Nano* 2013, 7, 6237-6243; S9: *ACS Appl. Mater. Interfaces* 2013, 5, 2446-2454; S10: *J. Mater. Chem. A* 2013, 1, 4793-4803).

| Electrodes | Capacitance-three electrode ($F\ g^{-1}$) | Capacitance-two electrode ($F\ g^{-1}$) | $E_{max}$ ($Wh\ kg^{-1}$) | $P_{max}$ ($kW\ kg^{-1}$) | Reference |
|---|---|---|---|---|---|
| $Ni(OH)_2$ nanoparticles | 1537 | — | — | — | S9 |
| $Ni(OH)_2$ thin films | 357 | — | — | — | S10 |

The aforementioned results suggest the utility of the devices in practical EC applications. The 3-D open channel in the nanoporous structure, with its high resulting surface area, provides more electrochemically active sites for redox reactions and fast ion transport. It is envisioned that the aforementioned attributes contribute to the obtained high capacitances.

In summary, the 3-D nanoporous nickel fluoride/oxide thin-film was anodically fabricated and hydrothermally treated to form a highly crystalline $Ni(OH)_2$ nanoporous layer. The nanoporous $Ni(OH)_2$ thin-film on nickel foils can be directly used as an additive-free electrode supercapacitor. The $Ni(OH)_2$ nanoporous layer delivers a high capacitance of about 1765 $F\ g^{-1}$. When assembled into asymmetric capacitor devices with porous activated carbon as the negative electrode, the entire device provides a capacitance of about 192 $F\ g^{-1}$ with energy and power density of about 68 $Wh\ kg^{-1}$ and 44 $kW\ kg^{-1}$, respectively.

Example 1.1. Fabrication

Nickel foils (0.125 mm, 99.9%, Sigma-Aldrich) were sonicated in ethanol for 1 hour before being used as substrates. Nanoporous nickel fluoride/oxide thin films were anodically grown in a solution of 0.2 M $NH_4F$ (≥98%, Sigma-Aldrich, USA) with 2 M deionized water in ethylene glycol (Fisher Scientific, USA) at constant current of 20 mA for 20 minutes in a two-electrode set-up at room temperature. After anodization, the samples were rinsed with $H_2O$ followed by drying under nitrogen gas flow.

Hydrothermal treatments on the as-prepared 3D nanoporous nickel fluoride/oxide thin film were conducted in an aqueous solution of 0.1 M NaOH at 100° C. for 4 hours to form highly crystalline $Ni(OH)_2$. The autoclave (Parr Instrument Company, Model 4744, 45 mL capacity) was filled to ~50% volume capacity with 0.1 M NaOH during the hydrothermal treatment (Caution: never fill an autoclave to more than 50%). Afterward, the samples were washed several times with $H_2O$ and dried under nitrogen gas flow. The mass loading of the NFO and $Ni(OH)_2$ films are approximately 0.06 and 0.04 mg $cm^2$, respectively.

Example 1.2. Characterization

A JEOL 6500F scanning electron microscope (SEM) was used to investigate the morphology of the samples. The crystal structure of the thin film was evaluated using X-ray diffraction (XRD) analysis on a Rigaku D/Max Ultima II (Rigaku Corporation, Japan) configured with CuKα radiation, graphite monoichrometer, and scintillation counter.

Raman spectra were recorded with a Renishaw Raman RE01 scope (Renishaw Inc., USA) using a 514 nm excitation argon laser. Investigation of the chemical composition of the nanoporous layers was performed using X-ray photoelectron spectroscopy (PHI Quantera XPS, Physical Electronics, USA). An Al anode at 25 W was used as the X-ray source with a pass energy of 26.00 eV, 45° take off angle, and a 100 µm beam size. A pass energy of 140 eV was used for survey spectra and 26 eV for atomic concentration spectra.

Example 1.3. Electrochemical Measurements

The nanoporous layers on nickel foils were directly used as additive-free electrodes (without binder, additional current collector or conducting carbon). Three electrode testing was performed in 6 M aq KOH using Pt foil and Hg/HgO as the counter and reference electrodes, respectively. The CVs were measured at different scan rates from 2 to 100 $mV\ s^{-1}$ in a potential window from 0 to 0.5 V (vs Hg/HgO). The galvanostatic discharge/charge curves were recorded at different current densities from 7 to 170 $A\ g^{-1}$. For the two electrode testing, the samples were assembled in an asymmetric cell with porous activated carbon film (mixed with 10% PTFE) as the negative electrode and glass microfiber filters (Whatman GF/F) as separators immersed in 6 M aq KOH. The mass ratio between the positive and negative electrodes is estimated according to the charge balance: $q_+ = q_-$. The CVs were measured at different scan rates from 10 $mV\ s^{-1}$ to 500 $mV\ s^{-1}$ in a potential window from 0 to 1.6 V. The galvanostatic discharge/charge curves were recorded at different current densities from 0.9 to 18 $A\ g^{-1}$ (based on total mass of the two electrodes). The EIS were carried out on the fresh cells at open circuit potentials with a frequency range from $10^{-2}$ to $1 \times 10^5$ Hz with ac signal amplitude of 5 mV. The CVs, galvanostatic discharge/charge curves and EIS measurements were carried out with an electrochemical analyzer (CHI 608D, CH Instruments, USA). The discharge/charge cycling tests were performed on a multichannel battery analyzer (BST8-WA, MTI Corporation, USA).

Example 1.4. Calculation of Specific Capacitance

The specific capacitance (C) of the devices were calculated from the CVs based on eq 1:

$$C = \frac{1}{2mv(\Delta V)} \int I(V) dV \quad (1)$$

In the aforementioned equation, m is the total mass of the electrodes, v is the scan rates ($V\ s^{-1}$), $\Delta V$ is the working potential window (V), and $1(V)$ is the response current (A).

The C of the devices calculated from discharge curves is based on eq 2:

$$C = \frac{I}{\left(\frac{dV}{dt}\right)m} \quad (2)$$

In the aforementioned equation, 1 is the discharge current (A), dV/dt represents the slope of the discharge curve, and m is the total mass of the electrodes.

Example 1.5. Calculation of Energy Density

The energy density (E) of the devices is calculated according to eq 3:

$$E = \frac{1}{2}C(\Delta V)^2 \quad (3)$$

In the aforementioned equation, C is the capacitance and ΔV is the working potential window.

Example 1.6. Calculation of Power Density

The power density (P) of the devices is calculated according to eq 4:

$$P = \frac{E}{t} \quad (4)$$

In the aforementioned equation, E is the energy density, and t is discharge time (h).

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. An electrode comprising:
   a nickel-based material; and
   at least one porous region on a surface of the nickel-based material,
   wherein the at least one porous region comprises a plurality of nickel hydroxide moieties,
   wherein the nickel hydroxide moieties are derived from the nickel-based material.

2. The electrode of claim 1, wherein the nickel-based material is selected from the group consisting of nickel alloys, nickel foils, nickel foams, nickel plates, porous nickel, nickel coupons, nickel blocks, nickel rods, nickel cylinders, non-porous nickel, and combinations thereof.

3. The electrode of claim 1, wherein the nickel-based material is a nickel foil.

4. The electrode of claim 1, wherein the nickel-based material consists essentially of nickel.

5. The electrode of claim 1, wherein the nickel-based material is in the form of a film.

6. The electrode of claim 1, wherein the nickel-based material serves as a current collector.

7. The electrode of claim 1, wherein the at least one porous region is directly associated with the surface.

8. The electrode of claim 1, wherein the at least one porous region is derived from the nickel-based material.

9. The electrode of claim 1, wherein the at least one porous region comprises a plurality of porous regions scattered throughout the surface.

10. The electrode of claim 1, wherein the at least one porous region comprises single porous region.

11. The electrode of claim 1, wherein the at least one porous region spans an entire surface of the nickel-based material.

12. The electrode of claim 1, wherein the at least one porous region comprises pores with sizes ranging from about 1 nm in diameter to about 1 μm in diameter.

13. The electrode of claim 1, wherein the at least one porous region comprises pores with sizes ranging from about 1 nm in diameter to about 500 nm in diameter.

14. The electrode of claim 1, wherein the at least one porous region has a thickness ranging from about 50 nm to about 500 μm.

15. The electrode of claim 1, wherein the nickel hydroxide moieties are embedded with the at least one porous region.

16. The electrode of claim 1, wherein the nickel hydroxide moieties are in at least one of crystalline form, semi-crystalline form, amorphous form, lattice form, and combinations thereof.

17. The electrode of claim 1, wherein the nickel hydroxide moieties are in crystalline form.

18. The electrode of claim 1, wherein the electrode consists essentially of the nickel-based material and the at least one porous region.

19. The electrode of claim 1, wherein the electrode is an anode.

20. The electrode of claim 1, wherein the electrode is a cathode.

21. The electrode of claim 1, wherein the electrode has a capacitance ranging from about 1,000 F/g to about 2,500 F/g.

22. The electrode of claim 1, wherein the electrode has a capacitance ranging from about 1,500 F/g to about 2,000 F/g.

23. The electrode of claim 1, wherein the electrode is a component of an energy storage device.

24. The electrode of claim 23, wherein the energy storage device is selected from the group consisting of capacitors, batteries, photovoltaic devices, photovoltaic cells, transistors, current collectors, fuel cell devices, water-splitting devices, two electrode systems, three electrode systems, and combinations thereof.

25. The electrode of claim 23, wherein the energy storage device is a capacitor.

26. The electrode of claim 25, wherein the capacitor is selected from the group consisting of lithium-ion capacitors, supercapacitors, asymmetric supercapacitors, asymmetric two electrode supercapacitors, additive-free electrode supercapacitors, micro supercapacitors, pseudo capacitors, electrochemical capacitors, two-electrode electric double-layer capacitors (EDLC), non-Faradaic electric double-material capacitors (EDLCs), Faradaic pseudocapacitors, and combinations thereof.

27. The electrode of claim 23, wherein the energy storage device has a capacity ranging from about 100 F/g to about 500 F/g.

28. The electrode of claim 23, wherein the energy storage device has a capacity ranging from about 100 F/g to about 200 F/g.

29. The electrode of claim 23, wherein the energy storage device has an energy density ranging from about of 10 μWh/cm$^2$ to about 100 μWh/cm$^2$.

30. The electrode of claim 23, wherein the energy storage device has an energy density ranging from about of 25 μWh/cm$^2$ to about 50 μWh/cm$^2$.

31. The electrode of claim 23, wherein the energy storage device has a power density ranging from about 1 mW/cm$^2$ to about 100 mW/cm$^2$.

32. The electrode of claim 23, wherein the energy storage device has a power density ranging from about 10 mW/cm$^2$ to about 50 mW/cm$^2$.

33. An electrode comprising:

a nickel-based material; and at least one porous region on a surface of the nickel-based material, wherein the at least one porous region has a thickness ranging from about 100 nm to about 50 μm, and wherein the at least one porous region comprises a plurality of nickel hydroxide moieties.

34. An electrode comprising:

a nickel-based material; and at least one porous region on a surface of the nickel-based material, wherein the at least one porous region comprises a plurality of nickel hydroxide moieties, wherein the electrode is a component of an energy storage device, and wherein the energy storage device retains at least 90% of its capacity after about 10,000 cycles.

* * * * *